(12) United States Patent
Bickley

(10) Patent No.: US 9,163,563 B2
(45) Date of Patent: Oct. 20, 2015

(54) FUEL METERING CONTROL

(75) Inventor: Daniel James Bickley, Solihull (GB)

(73) Assignee: ROLLS-ROYCE ENGINE CONTROL SYSTEMS LIMITED, Derby (GB)

(*) Notice: Subject to any disclaimer, the term of this patent is extended or adjusted under 35 U.S.C. 154(b) by 1045 days.

(21) Appl. No.: 13/269,801

(22) Filed: Oct. 10, 2011

(65) Prior Publication Data

US 2012/0085421 A1 Apr. 12, 2012

(30) Foreign Application Priority Data

Oct. 12, 2010 (GB) .................................. 1017166.8

(51) Int. Cl.
*F16K 17/38* (2006.01)
*F02C 9/26* (2006.01)
*F02C 9/28* (2006.01)

(52) U.S. Cl.
CPC . *F02C 9/263* (2013.01); *F02C 9/28* (2013.01); *F05D 2270/303* (2013.01); *F05D 2270/708* (2013.01); *Y10T 137/0324* (2015.04); *Y10T 137/7737* (2015.04)

(58) Field of Classification Search
CPC .................................. F02C 9/263; F02C 29/28
USPC ...................................... 137/468, 554; 60/281
See application file for complete search history.

(56) References Cited

U.S. PATENT DOCUMENTS

| 4,825,901 | A | 5/1989 | Smith |
| 6,182,438 | B1 | 2/2001 | Weber |
| 6,609,431 | B1 * | 8/2003 | Tietsworth et al. ........ 73/861.52 |
| 6,882,924 | B2 | 4/2005 | Miller |
| 2009/0301575 | A1 | 12/2009 | Arnett |

* cited by examiner

*Primary Examiner* — Kevin Lee
*Assistant Examiner* — P. Macade Nichols
(74) *Attorney, Agent, or Firm* — Oliff PLC

(57) ABSTRACT

A method of controlling the operation of a fuel metering unit of the type incorporating a temperature sensor is disclosed, the method comprising the steps of:
  sensing a change in temperature;
  using the sensed change in temperature to derive a fast temperature correction factor;
  using the sensed change in temperature to derive a slow temperature correction factor;
  using the fast and slow temperature correction factors in combination with a fuel demand to determine a metering valve position; and
  moving the metering valve to the determined metering valve position.

11 Claims, 2 Drawing Sheets

FUEL METERING CONTROL

Figure 1:
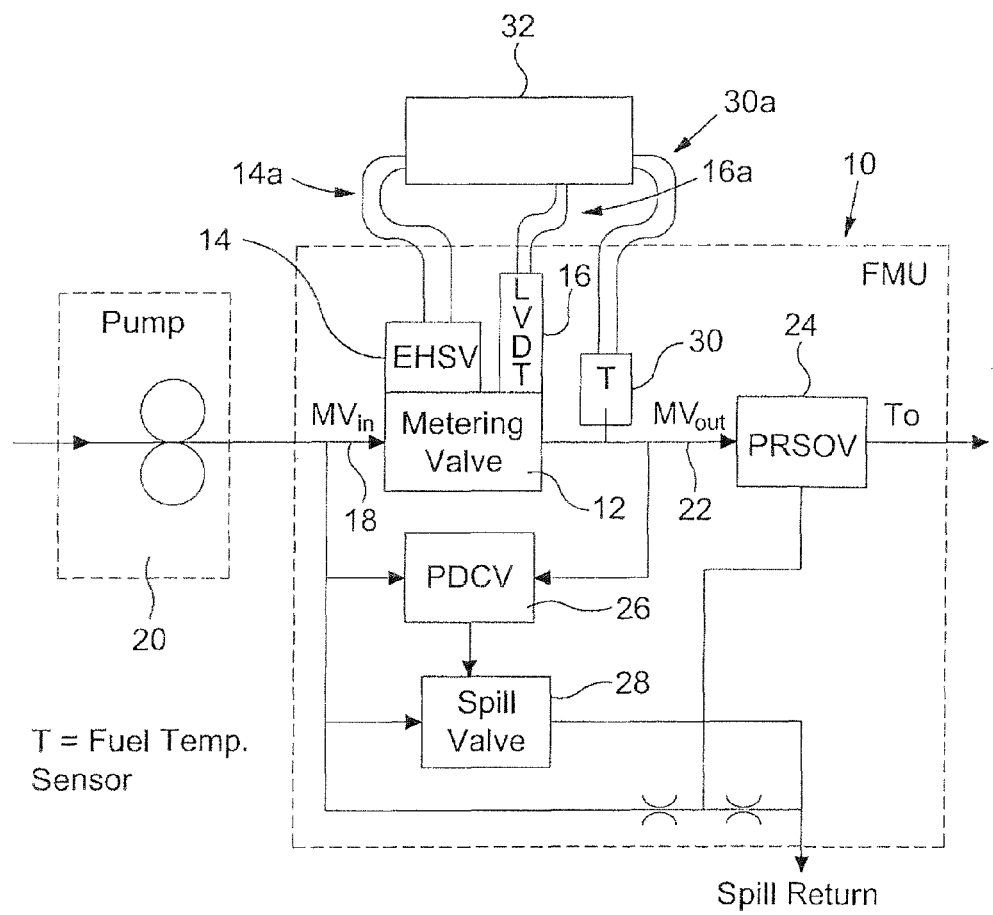

This invention relates to control of a fuel metering unit of an aircraft. In particular, it relates to a method of controlling the operation of a fuel metering unit whereby compensation for temperature variations can be achieved, and to a fuel metering arrangement incorporating such control.

A fuel metering unit operable to control the rate of supply of fuel to an aircraft engine typically includes a metering valve operable to control the rate at which fuel is able to flow from a high pressure fuel pump to an engine manifold. Commonly, the fuel metering unit will also include a number of other components, for example a spill valve may be provided to maintain a desired pressure differential across the metering valve, and a pressure raising valve may be provided to maintain a minimum system pressure. The operation of the metering valve is controlled by a suitable control unit. Typically, the control unit receives position signals indicative of the position of the metering valve and uses these to ensure that the metering valve is held in a desired position at any given time.

Temperature variations can significantly alter the operation of the fuel metering unit. For example, primary effects such as thermal expansion or contraction may result in a change in the operating characteristics of the metering valve, for example by changing the shape of the profile thereof. Also, temperature variations can result in changes in the operating characteristics of other components within the metering unit such as the metering valve position sensor or the spill valve. Furthermore, fuel properties such as density and viscosity change significantly with temperature, resulting in secondary thermal variation effects. Consequently, variations in temperature may result in the actual fuel delivery rate being higher or lower than the desired delivery rate, and this may impact negatively upon engine operation and performance.

Several schemes are known for compensating the temperature variations. U.S. Pat. No. 4,825,901 and US2009/0301575 describe mechanical compensation schemes. In U.S. Pat. No. 4,825,901, thermal expansion results in the mounting of the position sensor moving relative to the valve member of the metering valve with the result that a thermal correction is applied to the position signal used by the controller in controlling the metering valve. US 2009/0301575 operates by using a component to apply a thermal correction to the input side of the position sensor. In both of the schemes, a thermal correction is applied by adjusting the operation of the position sensor.

With these mechanical compensation schemes there is an element of compromise in that there is usually very little opportunity to change the design of the components by the time the compensation scheme has been tested. Further, the aforementioned secondary thermal variation effects are not accounted for in these mechanical compensation schemes. For example, the impact of thermally induced changes in fuel viscosity on metering accuracy, due to changes in internal leakage, is not considered in those schemes. This characteristic is highly non-linear with respect to temperature, whilst the mechanical schemes provide a generally linear relationship of compensation with temperature.

In addition to these mechanical correction schemes, a variety of electrical schemes are also known. For example, U.S. Pat. Nos. 6,182,438 and 6,882,924 describe arrangements in which a temperature sensor provides a temperature input to the controller which is used to apply a temperature correction to the operation of the fuel metering unit. However, these schemes do not achieve sufficiently robust or accurate compensation for certain applications. In particular, they are unsuitable for use in applications where the minimum metered flow level is relatively low such that any internal leakage, and the impact of the secondary thermal variation effects on this leakage, has a significant detrimental effect on metering accuracy.

It is an object of the invention to provide a method of controlling the operation of a fuel metering unit whereby temperature compensation can be achieved in a simple, robust and accurate manner. Another object is to provide a fuel metering unit incorporating such a method.

According to the invention there is provided a method of controlling the operation of a fuel metering unit of the type incorporating a temperature sensor, the method comprising the steps of:

sensing a change in temperature;

using the sensed change in temperature to derive a fast temperature correction factor;

using the sensed change in temperature to derive a slow temperature correction factor;

using the fast and slow temperature correction factors in combination with a fuel demand to determine a metering valve position; and moving the metering valve to the determined metering valve position.

It has been recognised that certain of the components or operating characteristics of a fuel metering system react more quickly to variations in temperature than others of the components or operating characteristics. For example the fuel density and viscosity changes that arise from a variation in temperature are immediate, as are the changes in the functional characteristics of, for example, parts of the metering valve and spill valve of the fuel metering unit that have a relatively low thermal capacity and are in direct contact with the fuel, and so their impact upon the operation of a fuel metering system is immediate and requires immediate correction. On the other hand, thermal expansion or contraction of, for example, parts of the metering valve, spill valve or position sensor of the fuel metering unit that have a relatively high thermal capacity is typically much slower. If the effects of such thermal expansion or contraction are compensated for too quickly or too slowly, then the compensation will itself result in metering inaccuracies. In accordance with the invention, by identifying the components and/or operating characteristics for which a fast temperature correction factor is required, and those for which a slow temperature correction factor is more appropriate, and correcting for these fast and slow temperature changes separately and at an appropriate time, temperature compensation may be achieved with improved accuracy.

The method may permit other correction factors to be incorporated. For example, correction factors to take into account back pressure and/or pump speed may be incorporated.

The invention further relates to a fuel metering unit comprising a metering valve and a temperature sensor, and a controller operable to control the position occupied by the metering valve, wherein the controller uses a sensed variation in temperature to derive fast and slow temperature correction factors, and controls the position occupied by the metering valve using a fuel demand in combination with the derived fast and slow temperature correction factors.

Figure 2:
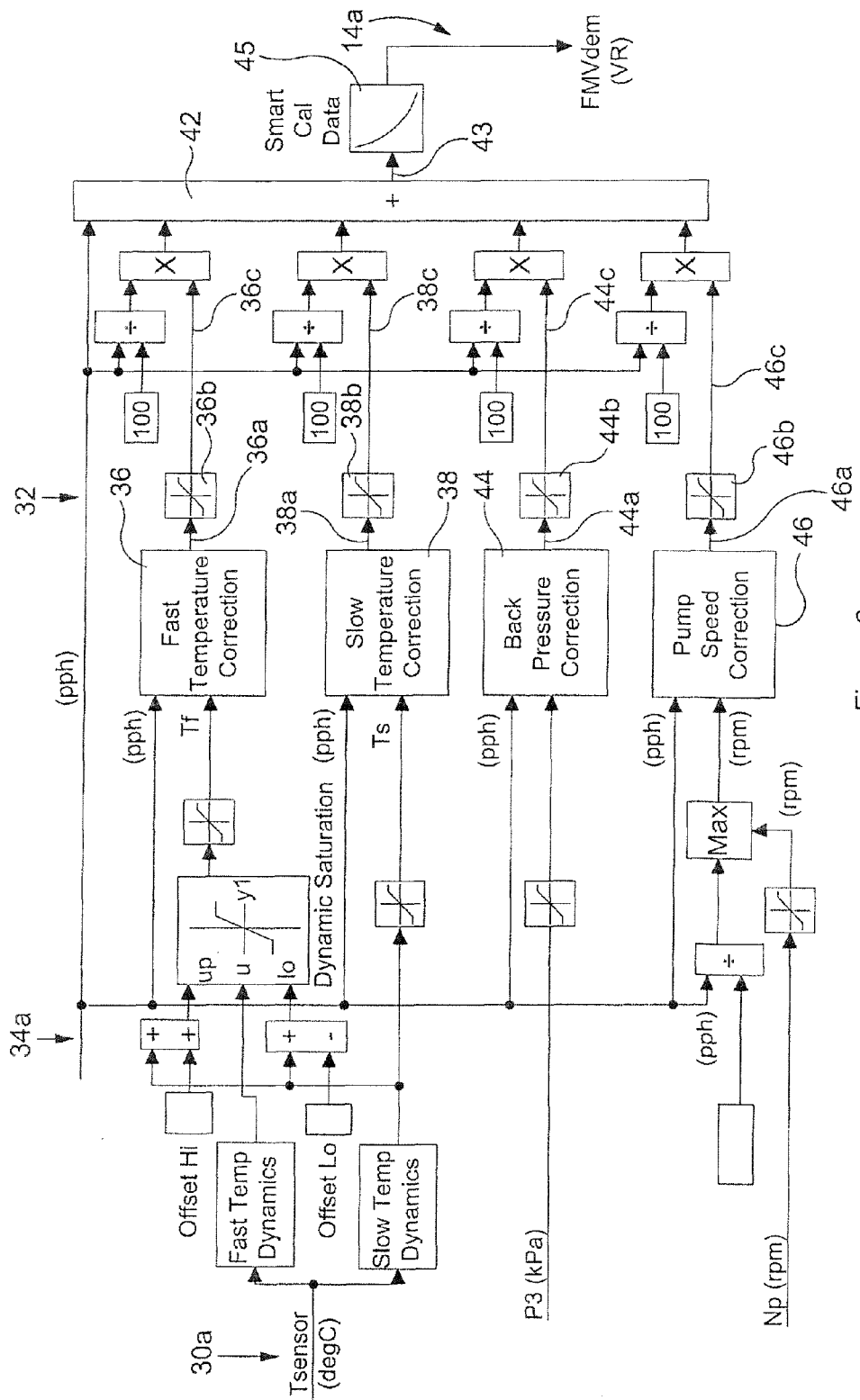

The invention will further be described, by way of example, with reference to the accompanying drawings, in which:

FIG. 1 is a schematic view illustrating a fuel metering unit in accordance with an embodiment of the invention; and FIG. 2 is a diagram illustrating the operation of the unit of FIG. 1.

Referring firstly to FIG. 1, a fuel metering unit (FMU) 10 is illustrated which is operable to control the rate at which fuel is supplied to a burner manifold of an aircraft engine. The FMU 10 includes a metering valve (MV) 12, the operation or position of which is controlled by an electro-hydraulic servo-valve (EHSV) 14. Changes in the position of the MV 12 result in changes in a metering profile (not shown) through which fuel flows to a delivery line 22.

A position sensor in the form of an LVDT 16 monitors the position of the MV 12. The MV 12 is connected to a supply line 18 which in turn receives fuel under pressure from a pumping unit 20, and supplies fuel to the delivery line 22, which is connected to the burner manifold (not shown). A pressure raising and shut off valve (PRSOV) 24 is provided in the delivery line 22 and serves to maintain the fuel pressure upstream thereof at at least a minimum pressure level in normal use.

A pressure drop control valve (PDCV) 26 is connected across the MV 12 and controls the operation of a spill valve (SV) 28 in such a manner as to maintain a substantially uniform pressure drop across the MV 12 in normal use.

A temperature sensor 30 is operable to monitor the fuel temperature in the delivery line 22. Although one specific location for the temperature sensor 30 is shown, it will be appreciated that the temperature sensor 30 could be located elsewhere with the FMU 10 without departing from the scope of the invention. Furthermore, more than one temperature sensor 30 could be located within the FMU 10 to provide any necessary redundancy or an improved level of fuel metering accuracy.

The temperature sensor 30 and the LVDT 16 respectively provide signals 30a, 16a to a controller 32 which uses those signals in deriving control signals 14a for use in controlling the operation of the EHSV 14 and hence the MV 12. The controller 32 may be, for example a full authority digital engine controller (FADEC) or other form of electronic engine controller, or could comprise another form of control unit.

As mentioned hereinbefore, certain components and/or operating characteristics of the FMU 10, hereinafter referred to collectively as the parameters, respond more quickly to variations in temperature than others of the parameters. In accordance with the invention, and as illustrated in FIG. 2, the controller 32 uses the temperature sensor signal 30a to apply correction factors to a fuel demand signal 34a to compensate for the effects of temperature variations on these parameters in deriving control signal 14a to be applied to the EHSV 14. To achieve this, the aforementioned parameters are grouped into parameters that respond relatively quickly to temperature variations and those that respond relatively slowly to temperature variations. Those that respond relatively quickly include, for example, changes in fuel density and viscosity. Other parameters that respond relatively quickly include the characteristics that are affected by thermal expansion or contraction of parts of the FMU 10 that have relatively low thermal capacity and are in direct contact with the fuel. These parameters include, for example, changes in the pressure drop across the MV 12 resulting from thermal expansion or contraction of resilient parts (for example springs) in the SV 28 and/or PDCV 26, and changes in the metering profile resulting from thermal expansion or contraction of MV 12 parts that form this profile. The parameters that respond more slowly include, for example, changes in the metering profile due to thermal expansion or contraction of parts in the FMU 10 that have relatively high thermal capacity, such as the LVDT 16. Other parameters that respond more slowly include characteristics affected by the thermal expansion and contraction of the body of the FMU 10 and those parts of the MV 12, SV 28 and PDCV 26 that have a relatively high thermal capacity. These characteristics include, for example, changes in the metering profile due to thermal expansion and contraction of the FMU 10 housing at the location of the MV 12. It will be appreciated that these lists are not exhaustive and that other parameters may also be taken into account.

As shown in FIG. 2, the output signal 30a from the temperature sensor 30 is applied to a fast temperature correction module 36 within the controller 32 which applies a thermal lead to cancel the thermal lag of the parameters that respond relatively quickly to temperature changes. A resultant fast compensation thermal value 36a is applied to a fast compensation look-up table 36b to generate a fast temperature correction factor 36c that reflects the effects of temperature, or a change in temperature, on the parameters that respond relatively quickly to temperature variations. The output signal 30a from the temperature sensor 30 is also applied to a slow temperature correction module 38 within the controller 32 which applies a thermal lead to cancel the thermal lag of parameters that respond relatively slowly to temperature variations. A resultant slow compensation thermal value 38a is applied to a slow compensation look-up table 38b to generate a slow temperature correction factor 38c that reflects the effects of temperature, or a change in temperature, on the parameters that respond relatively slowly to temperature changes. The fast and slow temperature correction factors 36c, 38c are then combined with other correction factors, described hereafter, and applied to the fuel demand signal 34a in a combining module 42. The output from the combining module 42 is a combined fuel flow demand signal 43 which is applied to smart calibration data 45 held in a non-volatile memory (NVM) in the controller 32 to generate a control signal 14a that is applied to the EHSV 14 to control the operation or position of the MV 12. The smart calibration data 45 is generated when the FMU 10 is tested prior to installation on the engine. This data is stored in a smart calibration module (not shown) on the FMU 10 and is loaded onto the controller 32 on installation.

In addition to compensating for changes in temperature, the controller 32 shown in FIG. 2 also compensates for changes in engine burner back pressure by applying the output of an engine pressure sensor (not shown) to a back pressure correction module 44, the output 44a of which is applied to a back pressure look-up table 44b to generate a back pressure correction factor 44c, which is used by the combining module 42 to generate the combined fuel flow demand signal 43. Likewise, the output of a pump speed sensor (not shown) is applied to a pump speed correction module 46, the output 46a of which is applied to a pump speed look-up table 46b to generate a pump speed correction factor 46c, which is also used by the combining module 42 in generating the combined fuel flow demand signal 43.

Each of the correction modules 36, 38, 44, 46 comprise algorithms consisting of development variables created from models and development test data. The algorithms in the fast and slow temperature correction modules 36, 38 can be tuned using the smart calibration data 45 that is stored in the NVM of the controller 32. This ensures that the algorithms account for the fact that the temperature sensitivity of tested units is slightly different to that predicted by modelling.

It will be appreciated that in using the invention, compensation for the effects of changes in temperature on the operation of the FMU 10 can be achieved with enhanced fuel metering accuracy. Although a dual thermal compensation scheme is described with the two thermal time constants based on best approximations of the range of effects that are modelled, it is envisaged that separate correction modules could be allocated to each of the compensated parameters. For example, the effects of changes in density and viscosity are instantaneous and could be separated from the effect of a change in metering profile which has a thermal time constant of the order of 5 to 10 seconds. By comparison, it is envisaged that the effect of thermal expansion and contraction of the housing of the FMU 10 has a thermal time constant exceeding 60 seconds and hence a separate correction module could be applied to this parameter.

It will be appreciated that a number of modifications or alterations may be made to the arrangement described herein before without departing from the scope of the invention. For example, the temperature compensation method could be applied to FMUs of forms other that that described herein. The PDCV 26 and SV 28, for example, could be combined into a single combined valve that controls the pressure drop across the MV 12. Furthermore, part or all of the processing function illustrated in FIG. 2 and described hereinbefore could be incorporated into the design of the FMU 10 and temperature sensor 30, rather than being carried out by a separate controller 32. This modified arrangement may require the application of high temperature electronics, preferably incorporated into the housing of the FMU 10 and used to support the operation of such a distributed thermal compensation function.

The invention claimed is:

1. A method of controlling the operation of a fuel metering unit incorporating a metering valve and a temperature sensor, the method comprising the steps of:
    sensing a change in temperature;
    using the sensed change in temperature to derive a fast temperature correction factor;
    using the sensed change in temperature to derive a slow temperature correction factor;
    using the fast and slow temperature correction factors in combination with a fuel demand to determine a metering valve position; and
    moving the metering valve to the determined metering valve position.

2. A method according to claim 1, wherein fast and slow temperature correction factors are derived using respective calibrated look-up tables.

3. A method according to claim 1, wherein the fast and slow temperature correction factors are used to apply corrections to the fuel demand to derive a corrected fuel demand to correct for the effects of temperature changes on at least one relatively fast responding parameter and at least one relatively slowly responding parameter.

4. A method according to claim 3, wherein the at least one relatively fast responding parameter comprises at least one of:
    fuel density;
    fuel viscosity; and
    thermal expansion and contraction of parts of the fuel metering unit of relatively low thermal capacity and in direct contact with the fuel.

5. A method according to claim 3, wherein the at least one relatively slowly responding parameter comprises:
    thermal expansion and contraction of parts of the fuel metering unit of relatively high thermal capacity and/or not in direct contact with the fuel.

6. A method according to claim 1, further comprising using at least one additional correction factor in determining the metering valve position.

7. A method according to claim 6, wherein the additional correction factor compensates for the effects of changes in at least one of:
    back pressure; and
    pump speed.

8. A fuel metering unit comprising a metering valve and a temperature sensor, and a controller operable to control the position occupied by the metering valve, wherein the controller uses a sensed variation in temperature to derive fast and slow temperature correction factors, and controls the position occupied by the metering valve using a fuel demand in combination with the derived fast and slow temperature correction factors.

9. A fuel metering unit according to claim 8, wherein the fast and slow temperature correction factors are used to apply corrections to the fuel demand to derive a corrected fuel demand to correct for the effects of temperature changes on at least one relatively fast responding parameter and at least one relatively slowly responding parameter.

10. A fuel metering unit according to claim 9, wherein the at least one relatively fast responding parameter comprises at least one of:
    fuel density;
    fuel viscosity; and
    thermal expansion and contraction of parts of the fuel metering unit of relatively low thermal capacity and in direct contact with the fuel.

11. A fuel metering unit according to claim 9, wherein the at least one relatively slowly responding parameter comprises:
    thermal expansion and contraction of parts of the fuel metering unit of relatively high thermal capacity and/or not in direct contact with the fuel.

* * * * *